US011169499B2

(12) United States Patent
Lee et al.

(10) Patent No.: US 11,169,499 B2
(45) Date of Patent: *Nov. 9, 2021

(54) APPARATUS AND METHOD FOR CONTROLLING COMFORT TEMPERATURE OF AIR CONDITIONING DEVICE OR AIR CONDITIONING SYSTEM

(71) Applicant: Samsung Electronics Co., Ltd., Suwon-si (KR)

(72) Inventors: Hyunjoo Lee, Seoul (KR); Jeongil Seo, Seoul (KR); Sangho Lee, Seongnam-si (KR); Dongsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,421

(22) Filed: Apr. 27, 2020

(65) Prior Publication Data

US 2020/0257257 A1 Aug. 13, 2020

Related U.S. Application Data

(63) Continuation of application No. 15/038,910, filed as application No. PCT/KR2014/011787 on Dec. 3, 2014, now Pat. No. 10,656,613.

(30) Foreign Application Priority Data

Dec. 3, 2013 (KR) .......................... 10-2013-0148955

(51) Int. Cl.
*G06F 17/00* (2019.01)
*G05B 19/048* (2006.01)
(Continued)

(52) U.S. Cl.
CPC ............ *G05B 19/048* (2013.01); *F24F 11/30* (2018.01); *F24F 11/62* (2018.01); *F24F 11/70* (2018.01);
(Continued)

(58) Field of Classification Search
CPC ...................................................... G05B 15/02
(Continued)

(56) References Cited

U.S. PATENT DOCUMENTS 5,058,388 A 10/1991 Shaw et al.
6,018,956 A 2/2000 Sakata et al.
(Continued)

FOREIGN PATENT DOCUMENTS

CN 1321861 A 11/2001
CN 1942720 A 11/2001
(Continued)

OTHER PUBLICATIONS

Decision of Patent dated Jun. 18, 2020 issued in Korean Intellectual Property Office for counterpart Application No. 10-2013-0418955.
(Continued)

*Primary Examiner* — Min Huang
(74) *Attorney, Agent, or Firm* — Jefferson IP Law, LLP

(57) ABSTRACT

A method for controlling a temperature in an air conditioning device according to an embodiment of the present invention includes: calculating an exponentially-weighted running mean temperature for outdoor temperatures measured for a predetermined period, setting a variable constant and a fixed constant according to the exponentially-weighted running mean temperature and an operation condition, setting a comfort temperature by multiplying the exponentially-weighted running mean temperature by the variable constant and adding the fixed constant, and controlling an indoor temperature by using the set comfort temperature. Here, the
(Continued)

fixed constant and the variable constant are constants obtained through a regression analysis of a distribution relationship between an exponentially-weighted running mean temperature and a comfort temperature, and the distribution of comfort temperatures is linearly increased from the fixed constant with a gradient of the comfort temperature according to the exponentially-weighted running mean temperature.

20 Claims, 7 Drawing Sheets

(51) Int. Cl.
　　　*G05D 23/19*　　　(2006.01)
　　　*F24F 11/62*　　　(2018.01)
　　　*F24F 11/30*　　　(2018.01)
　　　*F24F 11/70*　　　(2018.01)
　　　*F24F 110/10*　　　(2018.01)
　　　*F24F 110/22*　　　(2018.01)
　　　*F24F 110/20*　　　(2018.01)
　　　*F24F 110/12*　　　(2018.01)
　　　*F24F 11/65*　　　(2018.01)
　　　*F24F 11/46*　　　(2018.01)

(52) U.S. Cl.
　　　CPC .......... *G05D 23/1919* (2013.01); *F24F 11/46* (2018.01); *F24F 11/65* (2018.01); *F24F 2110/10* (2018.01); *F24F 2110/12* (2018.01); *F24F 2110/20* (2018.01); *F24F 2110/22* (2018.01); *G05B 2219/2614* (2013.01)

(58) Field of Classification Search
　　　USPC ....................................................... 700/276
　　　See application file for complete search history.

(56) References Cited

U.S. PATENT DOCUMENTS

| | | | |
|---|---|---|---|
| 10,656,613 B2* | 5/2020 | Lee .................... | G05D 23/1919 |
| 2001/0027862 A1 | 10/2001 | Sugawara et al. | |
| 2007/0244602 A1 | 10/2007 | Kanai et al. | |
| 2008/0120175 A1* | 5/2008 | Doering ............. | G06Q 30/0271 |
| | | | 705/14.67 |
| 2009/0159716 A1 | 6/2009 | Kim | |
| 2009/0232182 A1 | 9/2009 | Han et al. | |
| 2009/0281667 A1 | 11/2009 | Masui et al. | |
| 2010/0114401 A1 | 5/2010 | Tseng et al. | |
| 2010/0307731 A1 | 12/2010 | Yonezawa et al. | |
| 2011/0049252 A1 | 3/2011 | Lu et al. | |
| 2011/0106471 A1 | 5/2011 | Curtis et al. | |
| 2012/0042662 A1 | 2/2012 | Kim et al. | |
| 2012/0296480 A1 | 11/2012 | Raman et al. | |
| 2013/0134229 A1 | 5/2013 | Jang et al. | |
| 2013/0206382 A1 | 8/2013 | Ichishi et al. | |
| 2014/0277770 A1 | 9/2014 | Aljabari et al. | |
| 2014/0316584 A1* | 10/2014 | Matsuoka .......... | G05D 23/1917 |
| | | | 700/278 |
| 2016/0123617 A1 | 5/2016 | Vega | |
| 2017/0241659 A1 | 8/2017 | Choi et al. | |

FOREIGN PATENT DOCUMENTS

| | | |
|---|---|---|
| CN | 101206066 A | 6/2008 |
| CN | 101443597 A | 5/2009 |
| CN | 101464022 A | 6/2009 |
| CN | 101532706 A | 9/2009 |
| CN | 101878398 A | 11/2010 |
| CN | 102374590 A | 3/2012 |
| CN | 102589092 A | 7/2012 |
| CN | 103134152 A | 6/2013 |
| CN | 103292434 A | 9/2013 |
| EP | 0 415 747 A2 | 3/1991 |
| EP | 1 139 035 A2 | 10/2001 |
| EP | 2 042 816 A1 | 4/2009 |
| EP | 2 659 319 A2 | 11/2013 |
| JP | 5-264086 A | 10/1993 |
| JP | 6-294537 A | 10/1994 |
| JP | H07-139767 A | 5/1995 |
| JP | 2003-050040 A | 2/2003 |
| JP | 2008-232532 A | 10/2008 |
| KR | 10-0152103 B1 | 11/1998 |
| KR | 10-2002-0004097 A | 1/2002 |
| KR | 10-0966077 B1 | 6/2010 |
| KR | 10-2013-0127697 A | 11/2013 |

OTHER PUBLICATIONS

Extended European Search Report dated Jul. 13, 2017, issued in a counterpart European application No. 14868349.3-1602 / 3078919.
Chinese Office Action dated Jul. 3, 2018, issued in a counterpart Chinese application No. 201480072177.0.
Chinese Office Action dated Sep. 23, 2021, issued in Chinese Application No. 202011299297.8.

* cited by examiner

APPARATUS AND METHOD FOR CONTROLLING COMFORT TEMPERATURE OF AIR CONDITIONING DEVICE OR AIR CONDITIONING SYSTEM

CROSS-REFERENCE TO RELATED APPLICATION(S)

This application is a continuation application of prior application Ser. No. 15/038,910, filed on May 24, 2016, which is a U.S. National Stage application under 35 U.S.C. § 371 of an International application number PCT/KR2014/011787, filed on Dec. 3, 2014, and was based on and claimed priority under 35 U.S.C § 119(a) of a Korean patent application number 10-2013-0148955, filed on Dec. 3, 2013, in the Korean Intellectual Property Office, the disclosure of which is incorporated by reference herein in its entirety.

TECHNICAL FIELD

The present invention relates to an apparatus and a method for controlling a comfort temperature in an air conditioning device or an air conditioning system.

BACKGROUND ART

Generally, air conditioning devices or air conditioning systems in a building control an indoor temperature with a predetermined indoor temperature. However, it is difficult to satisfy both comfort and energy saving with such an air conditioning control method. Various energy saving methods using technologies such as a temperature setting control, zone control, $CO_2$ level control, and pre-cooling are suggested for air conditioning systems installed in a building. However, such control methods are mainly focused on energy saving and have limitations in controlling an indoor comfort temperature.

DISCLOSURE OF INVENTION

Technical Problem

Predicted Mean Vote (PMV) is used as an index for indicating indoor thermal comfort, and it expresses indoor thermal perception on the basis of various test results obtained in a testing environment. Accordingly, it has limitations in predicting indoor thermal perception by applying various practical environments. In order to supplement such a problem of PMV, an adaptive comfort theory based on test results in a practical indoor environment has been introduced.

An air conditioning device and an air conditioning system according to various embodiments of the present invention are remodeled to apply the adaptive comfort theory, and a building control device, system, and method are suggested to satisfy indoor comfort and enable an energy saving operation by applying a corresponding model to the air conditioning device and system.

Solution to Problem

A method for controlling a temperature in an air conditioning device according to an embodiment of the present invention includes determining a base temperature based on outdoor temperatures measured for a predetermined period, determining a comfort temperature based on the determined base temperature and an operation condition, and controlling an indoor temperature by using the determined comfort temperature.

An air conditioning device according to an embodiment of the present invention includes a detecting unit configured to measure a temperature; a storage unit configured to store information of a measured outdoor temperature and an operation condition; and a control unit configured to determine a base temperature based on outdoor temperatures measured for a predetermined period, to determine a comfort temperature based on the determined base temperature and an operation condition, and to control an indoor temperature by using the determined comfort temperature.

Advantageous Effects of Invention

If an air conditioning system of a building is controlled through an algorithm suggested by the present invention, indoor comfort can be secured and an energy saving effect can be obtained. By introducing additional parameters such as a cooling/heating mode, interior/exterior zone, priority mode, and humidity-compensated control, a more accurate indoor comfort temperature can be calculated.

Further, in case of operating in a static mode, installation and operation costs can be saved because input sensors other than a temperature sensor are not necessary. Generally, a system air conditioner integrates a temperature sensor and does not require additional devices. If another algorithm based on PMV is used, additional devices such as a humidity sensor, a $CO_2$ sensor, and an occupant detecting sensor are required; thereby additional costs are necessary for an existing building and an investment payback period becomes longer. If the present invention is applied, the investment payback period becomes lower in comparison with other algorithms. However, in case of dynamic mode, additional input parameters can be introduced to dynamically reflect an environment changing from time to time.

The present invention enables an air conditioner with a comfort control algorithm to be operated only by selection of an algorithm menu in an icon form without complicated functions of a building control system having to be learned for the energy saving operation. Generally, a building control solution can be effectively performed by a skilled engineer; however, one of the biggest advantages of the present invention is that it can provide an easy operation environment for a user.

Further, the present invention can select a method of using pre-calculated values to save the effort of calculating values of factors A, B, and C or a method of calculating dynamically corresponding to a building environment; thereby, the present invention can provide advantages that the comfort temperature can be optimized for various building environments.

MODE FOR THE INVENTION

Figure 1:
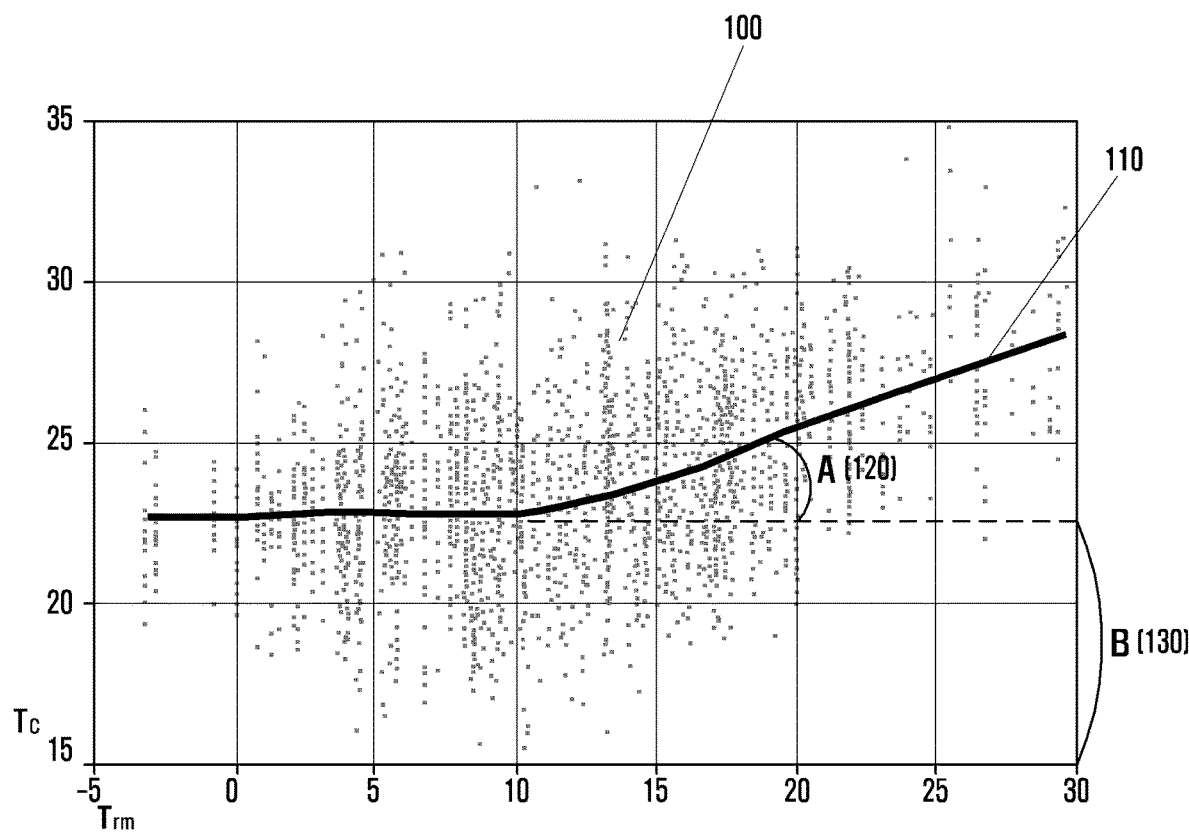
FIG. 1 is a graph illustrating a distribution diagram of comfort temperatures according to exponentially-weighted running mean temperatures.

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

In the present invention, a weighted value and a factor can be alternatively used.

An air conditioning device or an air conditioning system according to embodiments of the present invention utilizes an adaptive comfort algorithm to satisfy indoor comfort and energy saving simultaneously. Further, the adaptive comfort algorithm is provided in an icon form for an easier use of the algorithm so that a corresponding algorithm can be applied with a simple input of a setting value.

The adaptive comfort algorithm follows a theory that a human thermal perception differs according to a surrounding temperature, and it can be applied to the embodiments of the present invention as follows. First, the air conditioning device or the air conditioning system calculates a previous exponentially-weighted running mean temperature by collecting outdoor temperatures for a predetermined number of previous days and predicts an exponentially-weighted running mean temperature at a corresponding time by using the previous exponentially-weighted running mean temperature. Subsequently, the air conditioning device or the air conditioning system calculates a comfort temperature by applying comfort data obtained through a corresponding exponentially-weighted running mean temperature and a regression analysis. Subsequently, the air conditioning device or the air conditioning system control a temperature by applying the calculated comfort temperature.

Referring to ISO 7730, thermal comfort is defined as an emotional state indicating satisfaction to a thermal environment, and a thermal comfort index ranges between −3 and +3 as an objective index. The thermal comfort index 0 indicates the most comfortable state and the range between −0.5 and +0.5 indicates a normal comfort state. Here, the comfort temperature means a temperature range satisfying the above conditions.

The air conditioning device and/or the air conditioning system according to embodiments of the present invention calculate an exponentially-weighted running mean temperature by collecting outdoor temperatures for a predetermined period, determine a fixed constant and a variable constant according to the exponentially-weighted running mean temperature and an operation condition, and determine a comfort temperature of the air conditioning device/system by using the exponentially-weighted running mean temperature and constants (fixed constant and variable constant). Here, if the method of calculating an indoor comfort temperature by using the outdoor temperatures is used, environmental characteristics of an area where an air conditioning device is located can be properly reflected.

The exponentially-weighted running mean temperature can be obtained by using outdoor temperatures for a predetermined period. For this, outdoor temperatures are collected for a predetermined period before a base day, a previous exponentially-weighted running mean temperature is obtained by multiplying weighted values corresponding to each collected outdoor temperature and calculating an average, and a current exponentially-weighted running mean temperature is obtained by multiplying the previous exponentially-weighted running mean temperature by a weighted value set to each outdoor temperature in a base day.

Second, the fixed constant and the variable constants are constants obtained from a distribution relationship between exponentially-weighted running mean temperatures and comfort temperatures, and the distribution of the comfort temperatures has a characteristic of linearly increasing with a gradient of a variable constant from the size of the fixed constant according to the exponentially-weighted running mean temperature. Here, the fixed constant and the variable constant may have different values according to operation conditions, and they can be obtained by setting one or more operation conditions and by obtaining distribution of comfort temperatures according to the exponentially-weighted running mean temperature in a predetermined operation condition through a regression analysis. Accordingly, the fixed constant and the variable constant can be set differently according to a cooling/heating mode, humidity adjustment, and/or installation location of an air conditioning device, and the air conditioning device or system can store a data table of the fixed constants and the variable constants.

Third, the operation condition may include a cooling/heating mode, humidity adjustment, and/or installation location of an indoor device and may further include a priority mode of a comfort temperature. The cooling/heating mode can be determined by analyzing the exponentially-weighted running mean temperatures. If the exponentially-weighted running mean temperature is less than a predetermined temperature, the fixed constant and the variable constant are set for the heating mode; otherwise, the fixed constant and the variable constant are set for the cooling mode. The humidity adjustment can be set by a user, and the variable constant and the fixed constant are set for the humidity adjustment if a humidity compensation mode is set; otherwise, the variable constant and the fixed constant are set for a temperature-based operation. The installation location of an air conditioning device may be divided into an interior zone and an exterior zone according to a distance to a window, which can be known from identification information of the air conditioning device. Accordingly, when setting a comfort temperature, if the air conditioning device is installed in the interior zone, the variable constant and the fixed constant are set corresponding to the interior zone, and if the air conditioning device is installed in the exterior zone, the variable constant and the fixed constant are set corresponding to the exterior zone. If the installation location is not considered, the variable constant and the fixed constant are set for "all zones" covering the interior zone and the exterior zone. The priority mode may include an energy saving mode, normal mode, and/or comfort priority mode. In case of energy saving mode, a comfort temperature is reset by adding or subtracting a specific temperature to/from the comfort temperature according to the cooling/heating mode. In case of comfort priority mode, the comfort temperature is reset by adding or subtracting a specific temperature; and in case of normal mode, the air conditioning device is controlled with a predetermined temperature.

In the embodiments of the present invention, the base day is assumed to be yesterday and the predetermined period is assumed to be a period from yesterday to 8 days ago.

FIG. 1 is a graph illustrating a distribution diagram of comfort temperatures according to exponentially-weighted running mean temperatures.

The distribution of the exponentially-weighted running mean temperatures and the comfort temperatures appears as a pattern such as that illustrated in FIG. 1. Namely, the distribution of comfort temperatures can be obtained experimentally as shown by reference number 100, and such a pattern of the comfort temperature has a characteristic having a fixed value B in a range lower than a specific temperature and linearly increasing with an angle A in a range higher than the specific temperature as shown by reference number 100. In FIG. 1, Trm indicates an exponentially-weighted running mean temperature and Tc indicates a comfort temperature. When analyzing the distribution of comfort temperatures, it can be understood that the comfort temperature remains at a fixed value (value B in FIG. 1; hereafter, fixed constant) until reaching a specific Trm and linearly increases with a specific gradient A (hereafter, variable constant).

Accordingly, the comfort temperature can be calculated automatically by obtaining the values A and B for indicating a relationship between an outdoor temperature and an indoor comfort temperature based on outdoor temperature data and indoor comfort data through a regression analysis and by applying the values A and B to an air conditioning device or system for a temperature control according to the outdoor temperature. Namely, according to an embodiment of the present invention, the comfort temperature can be obtained by multiplying an exponentially-weighted running mean temperature by a variable constant A (gradient value for linearly increasing in the comfort temperature according to the exponentially-weighted running mean temperatures) and adding a fixed constant B to the calculated value of multiplication.

Hereafter, a method for obtaining the exponentially-weighted running mean temperature Trm and the comfort temperature is described. Abbreviations used in the embodiments of the present invention are defined as shown in Table 1.

TABLE 1

Trm: exponentially-weighted running mean temperature
Tout(n): outdoor temperature for a day
a, b, c, d, e, f: coefficient for a mean outdoor temperature
Tcomf(n): comfort temperature
Tcomf(n).max: maximum comfort temperature
Tcomf(n).min: minimum comfort temperature
α: coefficient for people's thermal perception
A, B: gradient and constant value obtained from regression analysis First, the present invention calculates an exponentially-weighted running mean temperature by collecting outdoor temperatures of previous days in order to obtain a comfort temperature. In case of collecting outdoor temperatures for the previous week, an exponentially-weighted running mean temperature Trm(n−1) just before a corresponding time can be calculated by using Formula 1. Formula 1 shows an example of collecting outdoor temperatures for a week (i.e., from 2 days ago to 8 days ago) before a base day (here, yesterday) and calculating a previous exponentially-weighted running mean temperature Trm(n−1) before the base day. Here, the days may be replaced with another predetermined time unit (for example, 1 hour).

$$Trm(n-1) = (Tout(n-2) + aTout(n-3) + bTout(n-4) + cTout(n-5) + dTout(n-6) + eTout(n-7) + fTout(n-8))/(1 + a+b+c+d+e+f)$$ Formula 1

Formula 1 obtains an average temperature of previous days or hours by applying different weighted values a-f respectively to outdoor temperatures Tout(n−2)–Tout(n−8) measured for the previous period (for example, a week or 7 hours). Here, Tout(n−2)–Tout(n−8) indicates outdoor temperatures for each day from 2 days ago to 8 days ago. The coefficients for a mean outdoor temperature a, b, c, d, e, and f respectively have different values between 0 and 1, and a smaller value is set as the number of previous days becomes greater (1>a>b>c>d>e>f>0). Accordingly, the exponentially-weighted running mean temperatures for 2 days ago to 8 days ago can be obtained by calculating the previous exponentially-weighted running mean temperature Trm(n−1) for the days before the base day (yesterday) by using Formula 1.

Second, an exponentially-weighted running mean temperature Trm(n) for a corresponding day (base day) is calculated by using the previous exponentially-weighted running mean temperature Trm(n−1) calculated through Formula 1. Formula 2 shows a method for obtaining the current exponentially-weighted running mean temperature Trm(n) of the base day.

$$T_{rm(n)} = (1-\alpha)T_{out(n-1)} + \alpha T_{rm(n-1)}$$ Formula 2

Referring to Formula 2, the current exponentially-weighted running mean temperature Trm(n) is calculated by applying a weighted value respectively to the outdoor temperature Tout(n−1) of the previous day (yesterday) and the previous exponentially-weighted running mean temperature Trm(n−1) through Formula 1. Here, the weighted value α is in the range between 0 and 1. According to McCartney, it is known that the most suitable value is 0.8.

Third, after obtaining the current exponentially-weighted running mean temperature Trm(n) by using the previous exponentially-weighted running mean temperature Trm(n−1), an indoor comfort temperature Tcomf(n) is calculated by applying values A and B obtained through a regression analysis of the current exponentially-weighted running mean temperature Trm(n). Formula 3 shows a method for calculating an indoor comfort temperature Tcomf(n) according to an embodiment of the present invention.

$$T_{comf(n)} + AT_{rm(n)} + B$$ Formula 3

In Formula 3, constants A and B indicate a relationship between an outdoor temperature and a comfort temperature that can be obtained through a regression analysis. Namely, if a distribution relationship between a weighted mean temperature and an experimentally-obtained comfort temperature is calculated through a regression analysis, it can be known that the comfort temperature remains at a specific value B in the range of a weighted mean temperature less than a specific weighted mean temperature and increases linearly after the weighted mean temperature as shown in FIG. 1. Accordingly, an indoor comfort temperature Tcomf(n) can be obtained by calculating a current exponentially-weighted running mean temperature Trm(n), multiplying the Trm(n) by a linear constant A, and adding a fixed constant A as shown by Formula 3.

Further, the comfort temperature Tcomf(n) can be adjusted by a user. Namely, the minimum value or the maximum value of an indoor comfort temperature can be applied by subtracting or adding a specific constant C from/to the comfort temperature Tcom(n) as shown by Formula 4.

$$T_{com(n) \cdot max} = T_{com(n)} + C, T_{com(n) \cdot min} = T_{com(n)} - C \quad \text{Formula 4}$$

As described above, the constants A and B that indicate a distribution relationship between an outdoor temperature and an indoor comfort temperature can be obtained through a regression analysis based on outdoor temperature data for a period set experimentally (for example, for a week) and indoor comfort data. Here, the corresponding constants A and B appear as the result of reflecting an environmental characteristic (i.e., outdoor temperature) of an area where experiments are performed. Therefore, if an indoor environment information of a building is properly applied to an algorithm for the corresponding building by using the constants A and B obtained through the regression analysis, an air conditioning device/system of the building can be controlled more effectively.

According to an embodiment of the present invention, the indoor temperature can be controlled in various forms in an air conditioning device/system by using Tcomf(n) obtained through the above method.

First, by dividing the temperature control mode into 2 types, the air conditioning device/system can operate in a cooling mode if the exponentially-weighted running mean temperature exceeds a base temperature (for example, 10° C.) and in a heating mode if the exponentially-weighted running mean temperature is lower than the base temperature. Second, the temperature control mode may be divided into a mode of using a setting value (static mode) and a manual input mode (dynamic mode), and the indoor comfort temperature can be controlled in a method of using values pre-calculated for each zone or in a method of dynamically calculating a factor by reflecting a building indoor environment. Third, the indoor temperature can be controlled by selecting one operating mode from a normal mode, an energy saving mode, and a comfort mode based on an input of an indoor factor. Fourth, the indoor comfort temperature can be controlled by calculating an exponentially-weighted running mean temperature and using values A and B considered with an indoor humidity. Fifth, the indoor comfort temperature can be controlled by dividing into an exterior zone, interior zone, and all zones according to a distance to a window and applying different values of A and B. Here, the "all zones" is applied if the distance to a window is short.

Hereafter, a configuration and an operation of an air conditioning device solely used for home are first described, and a configuration and an operation of an air conditioning system used for a building are subsequently described.

Figure 2:
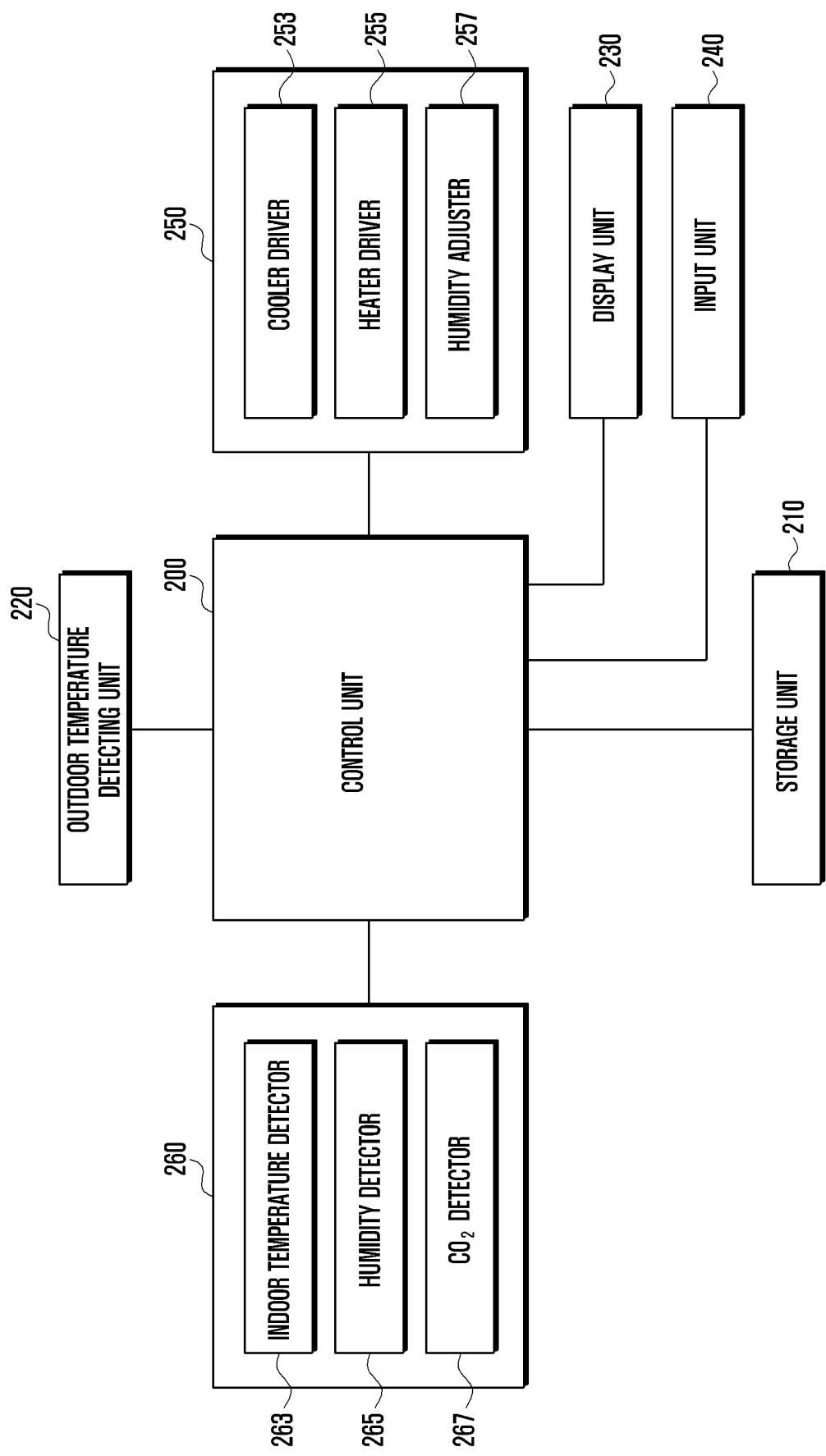
FIG. 2 is a block diagram illustrating a configuration of an air conditioning device.

FIG. 2 is a block diagram illustrating a configuration of an air conditioning device.

The air conditioning device according to an embodiment of the present invention may be configured with a control unit 200, storage unit 210, outdoor temperature detecting unit 220, display unit 230, input unit 240, temperature adjusting unit 250, and indoor detecting unit 260.

The outdoor temperature detecting unit 220 is installed in an outdoor space and detects an outdoor temperature. The outdoor temperature detecting unit 220 can be installed in the air conditioning device located at a specific part of the outdoor space. Further, the outdoor temperature detecting unit 220 can be connected to the air conditioning device with a wire or communicate with the air conditioning device through a wireless system such as a Wifi, Bluetooth, Zigbee, and Z-wave.

The display unit 230 outputs information of driving states and settings of the air conditioning device and the current indoor environment. The input unit 240 receives the information of driving states and settings of the air conditioning device. The display unit 230 and the input unit 240 may be configured with a touch screen in an integrated form.

The indoor detecting unit 260 may be configured with an indoor temperature detector 263, humidity detector 265, and $CO_2$ detector 267 which can respectively detect an indoor temperature, humidity, and $CO_2$ content influencing the indoor environment.

The storage unit 210 stores programs and data for controlling a comfort temperature according to an embodiments of the present invention. In particular, the storage unit 210 stores outdoor temperatures for a predetermined period according to the embodiments of the present invention, and stores and values A and B to calculate comfort temperatures in various conditions.

The control unit 200 calculates exponentially-weighted running mean temperatures collected by the outdoor temperature detecting unit 220 for a predetermined period, calculates an exponentially-weighted running mean temperature for a base day by using them, and determines a comfort temperature by applying values A and B in a predetermined condition to the calculated exponentially-weighted running mean temperature.

The temperature adjusting unit 250 may include a cooler driver 253, heater driver 255, and humidity adjuster 257. The temperature adjusting unit 250 adjusts an indoor temperature according to a comfort temperature output by the control unit 200. The technology of the temperature adjusting unit 250 is well known to those skilled in the art; therefore, detailed descriptions are omitted here.

The control unit 200 of the air conditioning device having the above configuration detects outdoor temperatures in a predetermined time interval through the outdoor temperature detecting unit 220 and stores the detected outdoor temperatures in the storage unit 210. Here, the predetermined time interval may be set to 1 time/day or more. For example, the outdoor temperature may differ in the morning, daytime, evening, and night. Accordingly, it is recommend to detect the outdoor temperature in a predetermined interval (for example, morning, daytime, and evening) in order to maintain the indoor temperature uniformly. The outdoor temperatures detected in a predetermined period such as this are stored in the storage unit 210. Further, the outdoor temperature detecting unit 220 may not be installed. In this case, the control unit 200 can collect outdoor temperatures of the installation location of the air conditioning device through an external server (for example, a server providing weather information).

If the operation of the air conditioning device starts with an adaptive comfort algorithm, the control unit 200 accesses to outdoor temperatures of a corresponding time period stored in the storage unit 210 and calculates a previous exponentially-weighted running mean temperature. Here, the previous exponentially-weighted running mean temperature can be calculated by collecting outdoor temperatures detected in the corresponding time period of predetermined days before a base day (for example, a preceding week of the base day). Namely, in order to calculate the previous exponentially-weighted running mean temperature, the control unit 200 collects outdoor temperature data stored in the storage unit 210 or temperature data for recent days from an external weather server. Here, the time period for collecting the outdoor temperatures is not limited and may be extended further. Subsequently, the control unit 200 calculates exponentially-weighted running mean temperatures before the base day by applying weighted values to the collected outdoor temperatures for each day by using Formula 1 and calculates the current exponentially-weighted running mean temperature from the result by using Formula 2.

Subsequently, the control unit 200 determines an indoor comfort temperature Tcomf by multiplying the current exponentially-weighted running mean temperature by a constant A and adding a constant B as shown by Formula 3. For the values of constants A and B, experimentally pre-calculated values can be used or dynamically calculated values can be used. Subsequently, the control unit 200 controls the temperature adjusting unit 250 to adjust an indoor temperature according to the determined comfort temperature. Here, after analyzing the indoor temperature detected by the indoor detecting unit 260, the control unit 200 controls the temperature adjusting unit 250 to maintain the indoor temperature as the predetermined comfort temperature. The air conditioning device according to the present invention may not have a configuration as shown in FIG. 2. For example, the air conditioning device according to an embodiment of the present invention may be configured with a detecting unit, storage unit, and control unit. The detector can measure an indoor/outdoor temperature, humidity, and $CO_2$ content. The storage unit can store information of measured outdoor temperatures and operation condition. The operation condition may include at least one of a cooling/heating mode, distance between an outside (window) and an air conditioning device (indoor device), humidity compensation mode, and energy saving mode.

The control unit can determine a base temperature based on outdoor temperatures measured for a predetermined period, determine a comfort temperature based on the determined base temperature and an operation condition, and control an indoor temperature by using the determined comfort temperature. In the present disclosure, the base temperature is used as the same meaning as the exponentially-weighted running mean temperature. The base temperature may correspond to an average of the outdoor temperatures calculated by applying a discriminative weight factor to each outdoor temperature measured for the predetermined period. The weight factor corresponding to an outdoor temperature measured previously is greater than the weight factor corresponding to an outdoor temperature measured previously. For example, if the weight factor of an outdoor temperature measured yesterday is 0.8, the weight factor of an outdoor temperature measured the day before yesterday becomes less than 0.8.

If a predetermined time is reached, the control unit can measure an outdoor temperature, store the measured outdoor temperature, and determine a base temperature based on the outdoor temperatures measured for the predetermined period. For example, if the predetermined time is 7 AM, the air conditioning device measures an outdoor temperature at 7 o'clock in the morning and can determine the base temperature based on the outdoor temperatures measured at 7 AM of preceding days. The predetermined time may include more than one time point (for example, 8:30 AM and 9 PM).

The control unit can determine a variable constant (first constant) and a fixed constant (second constant) corresponding to an operation condition and determine a comfort temperature by multiplying the base temperature by the variable constant and adding the fixed constant. The fixed constant and the variable constant are constants obtained through a regression analysis of a distribution relationship between the base temperature and the comfort temperature.

The comfort temperature may increase linearly with the gradient of the variable constant from the size of the fixed constant according to the exponentially-weighted running mean temperature. The fixed constant and the variable constant can be determined differently according to the range of the determined base temperature. For example, the fixed constant and the variable constant are determined for a heating mode if the indoor temperature is less than a predetermined temperature; otherwise, the fixed constant and the variable constant may be determined for a cooling mode. If the operation condition includes an energy saving condition, the fixed constant may be decreased or increased. For example, if the air conditioning device is running with an operation condition of a cooling mode and an energy saving mode, the fixed constant can be increased by 2° C.; and if the air conditioning device is running with an operation condition of a cooling mode and an energy saving mode, the fixed constant can be decreased by 1° C. If the operation condition includes a humidity compensation mode, the fixed constant and the variable constant may be differently determined according to a range of currently measured indoor humidity. The fixed constant and the variable constant can be determined differently according to a distance between the air conditioning device and the outside (for example, window side).

Figure 3:
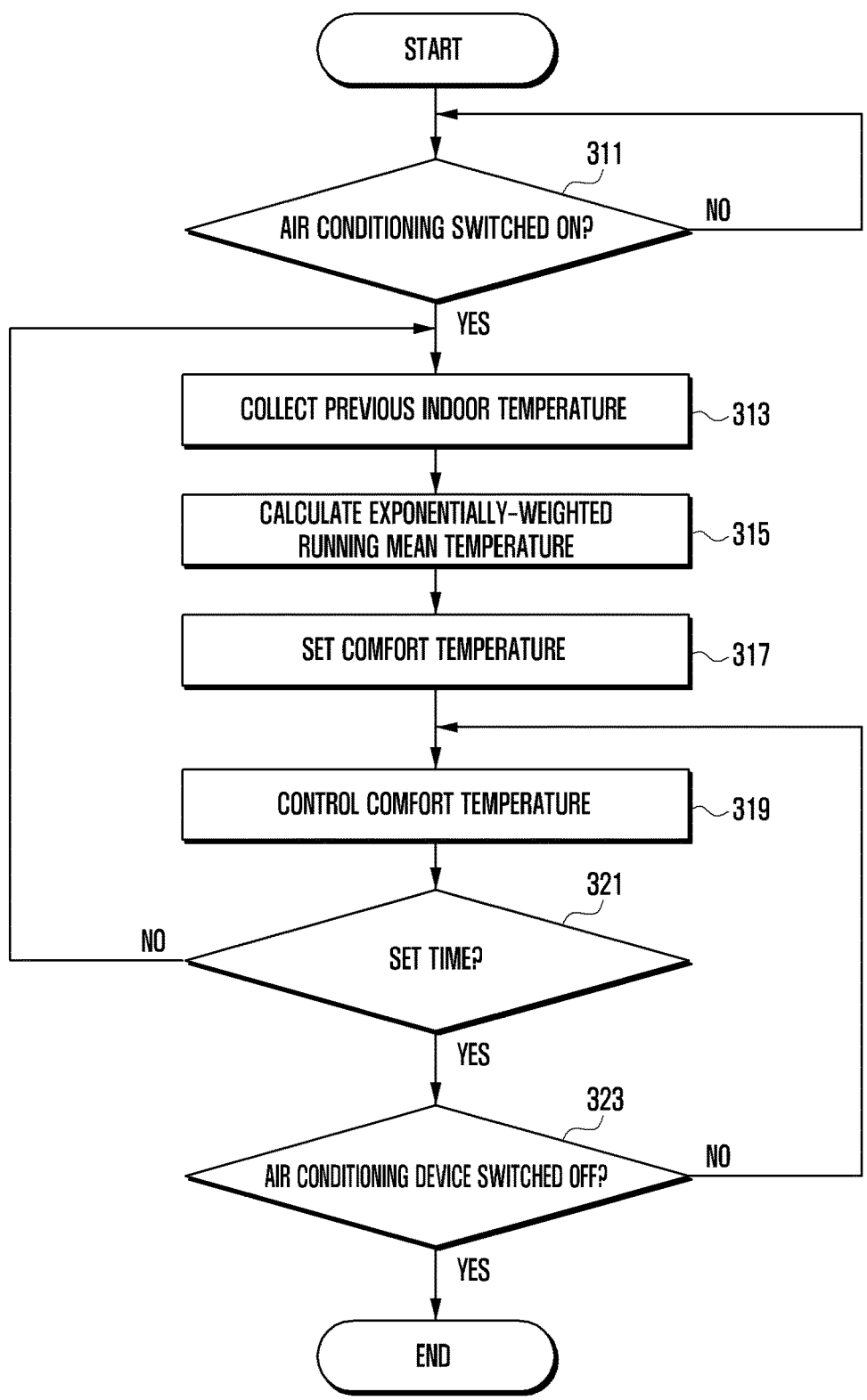
FIG. 3 is a flowchart illustrating a procedure of controlling an indoor temperature by setting a comfort temperature in an air conditioning device according to an embodiment of the present invention.

FIG. 3 is a flowchart illustrating a procedure of controlling an indoor temperature by setting a comfort temperature in an air conditioning device.

Referring to FIG. 3, if a user starts an air conditioning device with an adaptive comfort algorithm through an input unit 240, the control unit 200 detects it at step 311 and collects previous outdoor temperature data for a predetermined period corresponding to the current time at step 313. Subsequently, a previous exponentially-weighted running mean temperature is calculated by using the collected previous outdoor temperature data as shown by Formula 1. Here, by using outdoor temperature data Tout(n−2)–Tout(n−8) for a week (from 2 days ago to 8 days ago), Formula 1 multiplies each outdoor temperature of a corresponding day by each weighted value 1–f for the corresponding day and adds them ((Tout(n−2)+aTout(n−3)+bTout(n−4)+cTout(n−5)+dTout(n−6)+eTout(n−7)+fTout(n−8)); and the previous exponentially-weighted running mean temperature is obtained by dividing the sum of calculated values by the sum of weighted values (1+a+b+c+d+e+f). Here, the weighted values 1–f are set so that a weighted value of a recent day becomes greater, and each value is determined within a range between 0 and 1 (1>a>b>c>d>e>0). Accordingly, the previous exponentially-weighted running mean temperature can be obtained by multiplying previous outdoor temperatures measured for a predetermined period by each predetermined weighted value and calculating an average.

Subsequently, the control unit 200 calculates a current exponentially-weighted running mean temperature by using the previous exponentially-weighted running mean temperature at step 315. The current exponentially-weighted running mean temperature can be calculated by using Formula 2. The current exponentially-weighted running mean temperature can be obtained by multiplying the previous exponentially-weighted running mean temperature by a predetermined weighted value α, multiplying an outdoor temperature of yesterday Tout(n−1) by a weighted value, and adding them. Here, the weighted value for the outdoor temperature of yesterday Tout(n−1) is 1−α, and it is recommended to set the weighted value greater than 0.5 in order to give more weight to the exponentially-weighted running mean temperature.

After calculating the current exponentially-weighted running mean temperature as described above, the control unit 200 uses this to set a comfort temperature at step 317. Here, the comfort temperature can be obtained by using constants A and B experimentally obtained through a regression analysis of an exponentially-weighted running mean temperature and indoor comfort. Namely, if a regression analysis is performed for the exponentially-weighted running mean temperature and indoor comfort through experiments, an indoor comfort temperature has a characteristic of linearly increasing from a specific point of the weighted running mean temperature as shown in FIG. 1. Namely, as shown in FIG. 1, the comfort temperature remains at a value B until the exponentially-weighted running mean temperature reaches approximately 10° C. and increases linearly with a gradient A after 10° C. is reached. Accordingly, the comfort temperature can be obtained by multiplying the current exponentially-weighted running mean temperature calculated through Formula 2 by A and adding B to the result. Further, a comfort temperature for a cooling mode or a heating mode can be determined by analyzing the current exponentially-weighted running mean temperature. In an embodiment of the present invention, the comfort temperature can be set for a cooling mode if the current exponentially-weighted running mean temperature exceeds 10° C., and the comfort temperature can be set for a heating mode if the current exponentially-weighted running mean temperature is lower than 10° C.

After setting the comfort temperature as described above, the control unit 200 controls the temperature adjusting unit 250 to adjust a temperature according to the set comfort temperature at step 319. Here, the control unit 200 performs a cooling mode with the comfort temperature by controlling a cooler driving unit 253 of the temperature adjusting unit 250 if the comfort temperature is set for the cooling mode, and it performs a heating mode by controlling a heater driving unit 255 of the temperature adjusting unit 250 if the comfort temperature is set for the heating mode. While controlling the indoor temperature with the comfort temperature, the control unit 200 detects the indoor temperature through the indoor detecting unit 260, and it controls the temperature adjusting unit 250 so that the indoor temperature is maintained at the set comfort temperature. The comfort temperature is maintained until the next setting time.

The outdoor temperature has a daily temperature difference. Namely, the outdoor temperature is lowest before sunrise and highest in the daytime. Accordingly, it is recommended to reset the comfort temperature of the air conditioning device according to a change of outdoor temperature. Namely, by setting a predetermined time point or time interval, the control unit 200 detects an indoor temperature if the predetermined time is reached, detects an outdoor temperature through the outdoor temperature detecting unit 220, and stores the outdoor temperature data in the storage unit 210 at a corresponding time of a corresponding day at step 321. Subsequently, the control unit 200 returns to step 313, collects outdoor temperature data of a corresponding time for a predetermined period from the storage unit 210, and calculates a previous exponentially-weighted running mean temperature by using Formula 1. Subsequently the control unit calculates a current exponentially-weighted running mean temperature by using the calculated previous exponentially-weighted running mean temperatures and outdoor temperature data for a corresponding time of yesterday at step 315. Subsequently, the control unit 200 re-calculates a comfort temperature by applying values A and B to the current exponentially-weighted running mean temperature calculated at the predetermined time at step 317. Subsequently, the control unit 200 controls the indoor temperature by using the newly set comfort temperature. Here, if the time interval for setting the comfort temperature is short, the comfort temperature can be set more precisely according to a temperature change.

The above control of the comfort temperature is repeated until the air conditioning device is switched off; and, if a request for switching off the air conditioning device is generated, the control unit 200 identifies the request at step 323 and terminates the control of the air conditioning device.

Figure 4:
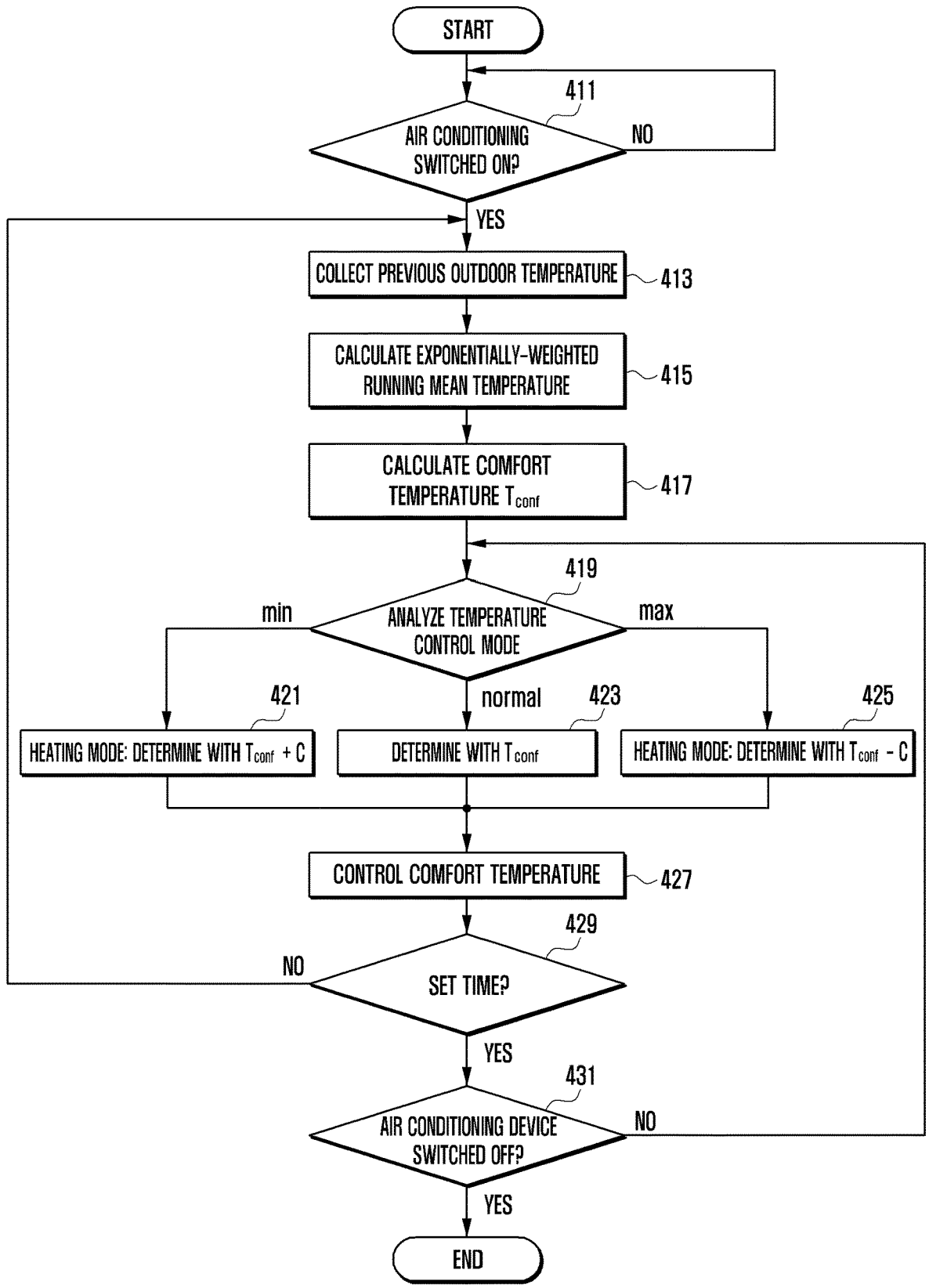
FIG. 4 is a flowchart illustrating a procedure of controlling an indoor temperature by setting a comfort temperature in an air conditioning device according to another embodiment of the present invention.

FIG. 4 is a flowchart illustrating a procedure of controlling an indoor temperature by setting a comfort temperature in an air conditioning device according to another embodiment of the present invention.

Referring to FIG. 4, if the air conditioning device is switched on, the control unit 200 detects it at step 411, collects outdoor temperatures for a predetermined period at step 413, and calculates a previous exponentially-weighted running mean temperature by using them. Subsequently, the control unit 200 calculates a current exponentially-weighted running mean temperature by using the previous exponentially-weighted running mean temperature and an outdoor temperature of a base day at step 415, and it obtains a comfort temperature by applying values A and B to the current exponentially-weighted running mean temperature at step 417. When calculating the comfort temperature, the control unit 200 can calculate a comfort temperature for a cooling mode or a heating mode according to the current exponentially-weighted running mean temperature. Namely, as described above, the comfort temperature can be set for a heating mode if the current exponentially-weighted running mean temperature is lower than 10° C. and for a cooling mode if the current exponentially-weighted running mean temperature is higher than 10° C.

Subsequently, the control unit 200 sets a comfort temperature for controlling an actual temperature by analyzing a priority mode for controlling the air conditioning device at step 419. Here, the priority mode may include an energy saving mode, normal mode, and maximum comfort priority mode for controlling an indoor temperature in the heating or cooling mode. In this case, the comfort temperature can be set by using Formula 4. In the cooling mode, the control unit 200 detects the energy saving mode at step 419 and sets the comfort temperature with Tcomf+C at step 421. In the cooling mode, the control unit 200 may detect the maximum comfort control mode at step 419 and set the comfort temperature with Tcomf-C at step 425. In the cooling mode, the control unit 200 may detect the normal mode at step 419 and set the comfort temperature with Tcomf at step 423. Further, in the heating mode, the control unit 200 may detect the energy saving mode at step 419 and set the comfort temperature with Tcomf+C at step 421. In the cooling mode, the control unit 200 may detect the maximum comfort control mode at step 419 and set the comfort temperature with Tcomf-C at step 425. In the cooling mode, the control unit 200 may detect the normal mode at step 419 and set the comfort temperature with Tcomf at step 423.

After setting the comfort temperature as described above, the control unit 200 controls the temperature adjusting unit 250 to adjust the indoor temperature with the set comfort temperature at step 427. If a predetermined time is reached in the state of controlling the indoor temperature with the set comfort temperature, the control unit 200 stores the current temperature in the storage unit 210, repeats the above steps by returning to step 413, and performs the operation of obtaining the comfort temperature at the predetermined time. The above operation is performed repeatedly until the air conditioning device is switched off; and, if the air conditioning device is switched off, the control unit 200 detects it at step 431 and terminates the operation of the air conditioning device.

When obtaining the comfort temperature, the control unit 200 may obtain the comfort temperature by considering a humidity. This will be described later in a procedure of controlling a comfort temperature for an air conditioning device.

As described above, the air conditioning device according an embodiment of the present invention sets a comfort temperature by using an outdoor temperature to control an indoor temperature. For this, the control unit 200 collects outdoor temperature data for recent days from a database stored in the storage unit 210 or from an external weather server. Here, the period of collecting outdoor temperature data is not limited and may be further extended. Subsequently, the control unit 200 calculates an exponentially-weighted running mean temperature of one day before by applying weighted values corresponding to each day to the outdoor temperature data collected for a predetermined period as shown by Formula 1, and it calculates an exponentially-weighted running mean temperature of a corresponding day by using the result as shown by Formula 2.

Subsequently, the control unit 200 identifies a cooling or heating mode according to the exponentially-weighted running mean temperature and selects values A and B for calculating a comfort temperature if a priority mode and/or a humidity compensation mode is identified. Finally, the control unit 200 can obtain an indoor comfort temperature Tcomf by multiplying the exponentially-weighted running mean temperature by a constant A and adding a constant B as shown by Formula 3. Here, the constants A and B may have values pre-calculated experimentally or may be applied by calculating dynamically. Generally, in case of air conditioning devices installed at home, the pre-calculated constants A and B may be used to reduce the effort of calculating.

The air conditioning device and system according to an embodiment of the present invention uses an adaptive comfort algorithm for a comfort control, and the adaptive comfort algorithm can be implemented through a logic editor. Here, the factors used in the formula of the adaptive comfort algorithm can be selected from a static method or a dynamic method. An indoor environment can be identified through a $CO_2$ sensor, occupant detecting sensor, and entrance management database, which can be applied to the adaptive comfort algorithm.

Figure 5:
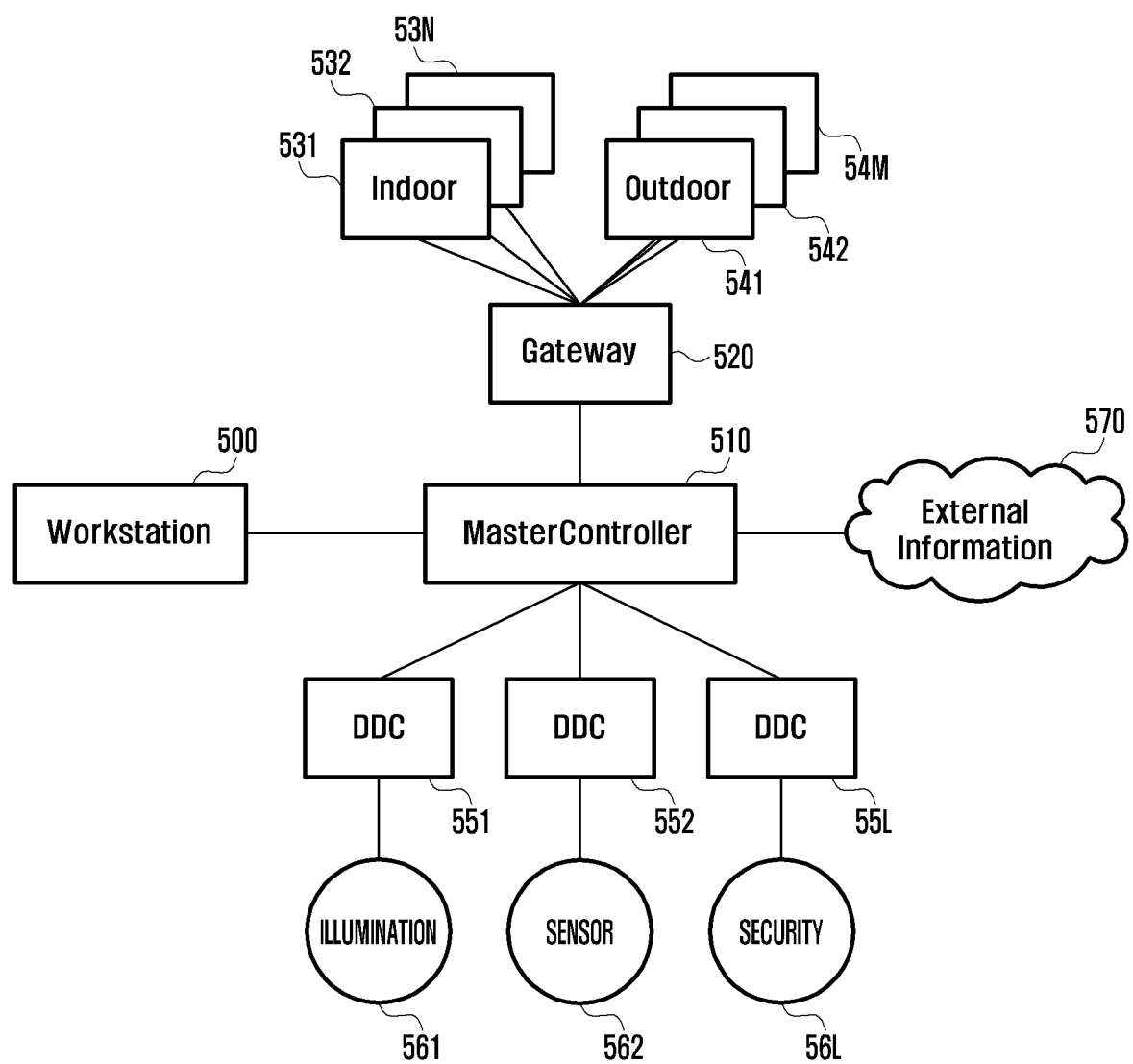
FIG. 5 is a block diagram illustrating a configuration of an air conditioning system according to an embodiment of the present invention.

FIG. 5 is a block diagram illustrating a configuration of an air conditioning system according to an embodiment of the present invention.

The air conditioning system can be installed in an environment of a building or a hospital.

Referring to FIG. 5, a workstation 500 is a terminal used by a supervisor of the air conditioning system and provides an interface for monitoring and controlling equipment subordinately connected to a master controller 510. One workstation 500 can manage a plurality of master controllers 510.

The master controller 510 is the uppermost device connected to all the devices in a building and collects and controls state information of each device. The master controller 510 includes a function of collecting weather information from an outer source or historical weather information from an internal database. Further, it is possible to control and monitor equipment of another vendor (for example, illumination device 561, sensor 562, and security device 56L) through DDCs (direct digital controls) 551-55L.

A gateway 520 is a device for managing subordinate devices having the same function and takes a role of totally controlling devices of the same product group. The gateway 520 may be an LED illumination gateway or a system air conditioner (SAC) gateway. In the air conditioning system according to an embodiment of the present invention, the gateway 520 may be the SAC gateway. The SAC gateway 520 collects and controls information by connecting to indoor devices 531-53N and outdoor devices 541-54M of the air conditioning device, and it can launch a control logic of a simple type such as a scheduler through its own storage space and a processing function.

The indoor devices 531-53N can be installed variably according to a range of a temperature control. Namely, the indoor devices 531-53N can be installed individually in different floors or in different locations such as a window side (exterior zone) and a side displaced from a window (interior zone). Further, one or more outdoor devices 541-54M can be installed at various locations. The outdoor devices 541-54M may include an outdoor temperature detecting unit for detecting an outdoor temperature. Further, the outdoor temperature detecting unit can be installed independently from the outdoor devices 541-54M.

In an embodiment of the present invention, the master controller 510 provides information including identification information (indoor device ID) corresponding to the outdoor devices 531-53N, installation floor, and installation locations (exterior zone and interior zone), and the installation floor and location of a corresponding indoor device can be identified by using the identification information of the indoor devices 531-53N when controlling a temperature. The master controller 510 can detect the outdoor temperature and store the outdoor temperature information when controlling a temperature. If a plurality of outdoor temperature detecting units is installed, the master controller 510 can store the outdoor temperature information together with the location information of the outdoor temperature detecting unit. Further, the outdoor temperature information output by the outdoor temperature detecting unit is stored by days and hours, an exponentially-weighted running mean temperature is obtained by using outdoor temperatures of a corresponding time band at a calculation point of the comfort temperature (i.e., setting time) for each day, a comfort temperature is set by applying constants A and B corresponding to the installation locations of the indoor devices 531-53N and the priority mode, and the indoor devices 531-53N are controlled according to the set comfort temperatures.

The air conditioning system having the above configuration must control each air conditioning device (i.e., indoor devices 531-53N). For this, the workstation 500 and/or the master controller 510 provides a writing environment for a control logic so that a supervisor of a building can easily apply an energy saving algorithm Here, the control logic is written in a list of conditions for operating and controlling terminal equipment (indoor devices 531-53N) independently by the supervisor of the air conditioning system through the workstation 500, and the control logic is stored in the master controller 510 or the workstation 500 in a software form. The air conditioning system can be connected to each device through the control logic and can perform a control of equipment.

Figure 6:
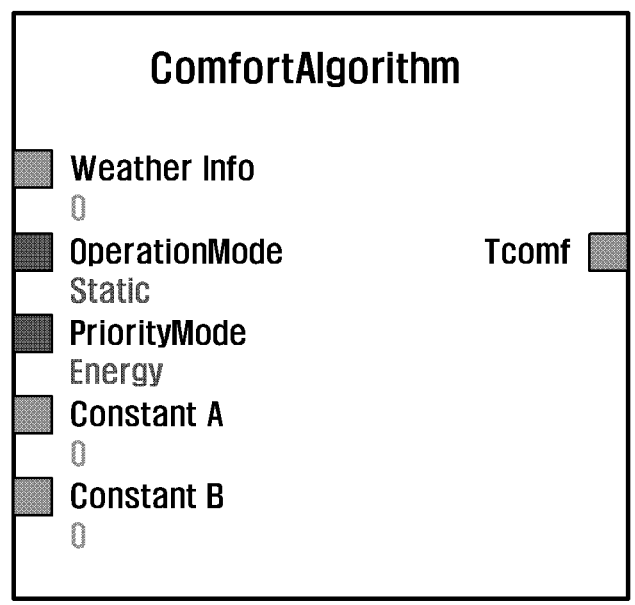
FIG. 6 is a block diagram illustrating an example of a control logic for controlling air conditioning devices in an air condition system.

FIG. 6 is a block diagram illustrating an example of a control logic for controlling air conditioning devices in an air condition system.

Referring to FIG. 6, in order to apply the adaptive comfort algorithm easily, a supervisor has to control each indoor device 531-53N through the workstation 500 or the master controller 510. Here, input factors for setting a comfort temperature of the indoor device 531-53N may include outdoor temperature information (weather information) of recent days, operation mode, priority mode, and constants A and B as shown in FIG. 6.

Here, the operation mode may be one of a static mode and a dynamic mode. The static mode sets a comfort temperature by using pre-calculated constant values A and B, and the dynamic mode sets a comfort temperature based on constant values A and B measured in an environment of a building or a hospital. The workstation 500 or the master controller 510 displays the static or dynamic mode in an input area of the operation mode in a toggle form in the control logic shown in FIG. 6, and a desired operation mode can be set according to a supervisor's selection.

Further, in the priority mode, one of an energy saving mode, normal mode, and comfort priority mode can be selected. Namely, after obtaining the comfort temperature, the set comfort temperature can be adjusted by a predetermined constant value C. In case of cooling mode, the normal mode is selected and the calculated comfort temperature Tcomf is used as it is. In case of controlling a temperature higher than the comfort temperature, the energy saving mode is selected and the comfort temperature is set with Tcomf+C. In case of controlling a temperature lower than the comfort temperature, the comfort mode is selected and the comfort temperature is set with Tcomf-C. Further, in case of heating mode, the normal mode is selected and the calculated comfort temperature Tcomf is used as it is. In case of controlling a temperature lower than the comfort temperature, the energy saving mode is selected and the comfort temperature is set with Tcomf-C. In case of controlling a temperature lower than the comfort temperature, the comfort priority mode is selected and the comfort temperature is set with Tcomf+C. The workstation 500 or the master controller 510 displays the energy saving mode, normal mode, and comfort priority mode by toggling in the control logic shown in FIG. 6 according to the number of inputs (for example, touches) generated in an area of the priority mode, and the priority mode can be set according to a supervisor's selection.

Further, the supervisor can manually input a desired constant value by selecting an area of constant A or constant B displayed in the control logic. If a desired mode or constant value is input through the control logic shown in FIG. 6, the master controller 510 can set the comfort temperature Tcomf of a corresponding indoor device.

Here, the distribution of the exponentially-weighted running mean temperature and the comfort temperature may appear as the same pattern shown in FIG. 1. The comfort temperature is variously set according to various operating conditions of the air conditioning system. Accordingly, a comfort temperature in a desired condition can be set by determining the values of constant A or constant B according to such conditions. The conditions may include a cooling/heating mode, humidity, and/or installation location of an indoor device. First, the cooling mode or heating mode can be set according to the exponentially-weighted running mean temperature. Here, the cooling mode may be set if the exponentially-weighted running mean temperature exceeds 10° C., and the heating mode may be set if the exponentially-weighted temperature is lower than 10° C. Further, an indoor comfort temperature can be controlled by using values A and B considered with a humidity in order to obtain an indoor weighted running mean temperature, and different values of A and B can be applied by dividing into an exterior zone and an interior zone according to a distance to a window. If the distance is short, the indoor comfort temperature can be controlled by classifying into all zones. In this case, the constant A and the constant B can be set as shown in Table 2.

TABLE 2

|  |  | Zone | A | B |
| --- | --- | --- | --- | --- |
| Temperature-based comfort model | Cooling | All zones | 0.2-0.3 | 18-22 |
|  | Heating | Exterior zone | 0.2-0.3 | 18-22 |
|  |  | Interior zone | 0.2-0.3 | 18-22 |
|  |  | All zones | 0.06-0.08 | 22-26 |
|  |  | Exterior zone | 0.05-0.07 | 22-26 |
|  |  | Interior zone | 0.01-0.02 | 22-26 |
| Humidity-compensated comfort model | Cooling | All zones | 0.3-0.4 | 18-22 |
|  | Heating | Exterior zone | 0.2-0.3 | 18-22 |
|  |  | Interior zone | 0.3-0.4 | 18-22 |
|  |  | All zones | 0.06-0.08 | 22-26 |
|  |  | Exterior zone | 0.04-0.06 | 22-26 |
|  |  | Interior zone | 0.01-0.02 | 22-26 |

The master controller 510 stores the values of constants A and B shown in Table 2, and it can obtain a comfort temperature by selecting appropriate values of constants A and B according to a condition of an indoor device when calculating the comfort temperature. After calculating the comfort temperature, the master controller 510 can control the indoor devices of the air conditioning system by setting a comfort temperature according to an indoor condition. Namely, the master controller 510 can control the indoor temperature by selecting one of a normal mode, energy saving mode, and comfort priority mode according to a response from occupants of a building.

Figure 7:
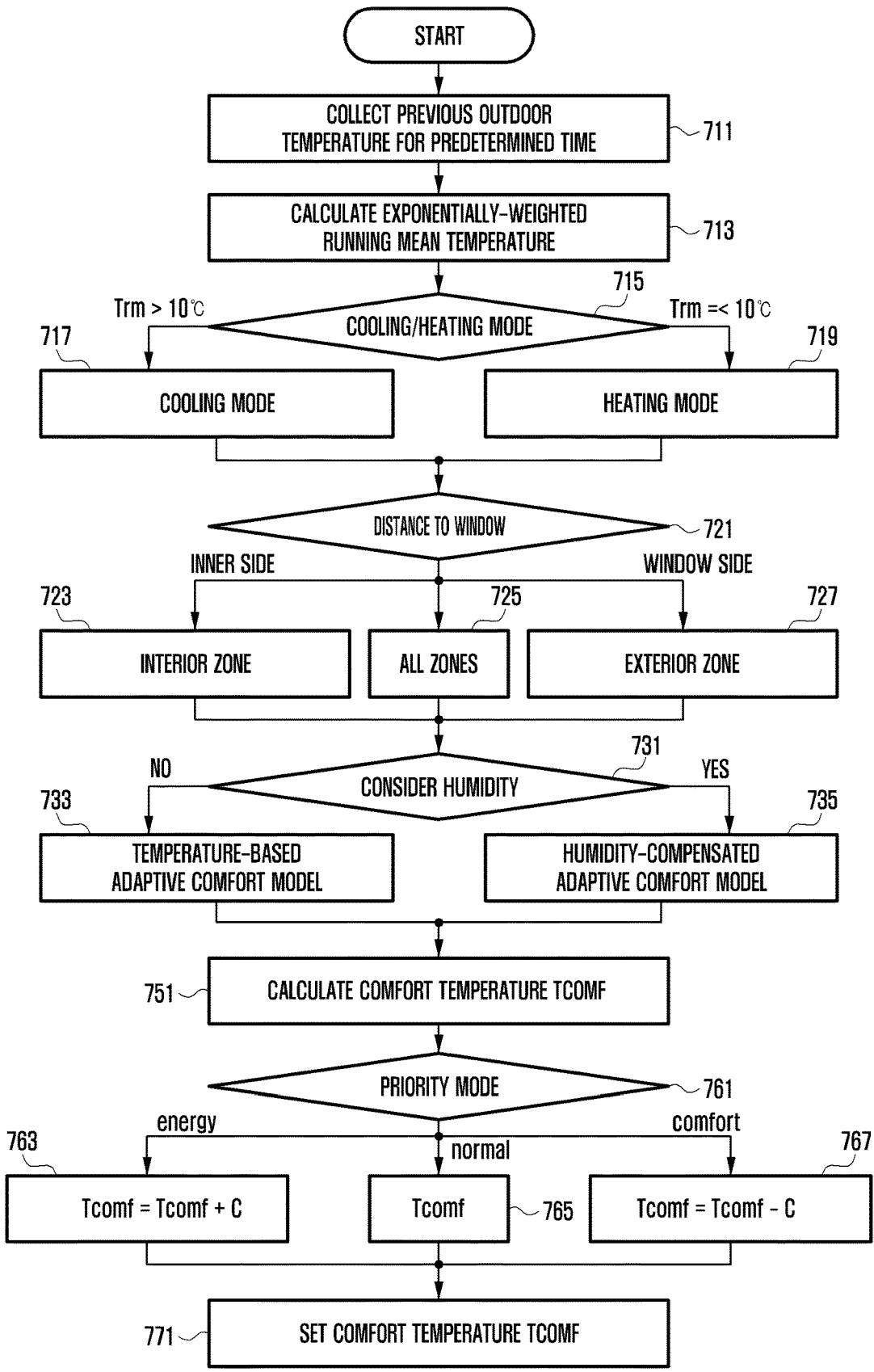
FIG. 7 is a flowchart illustrating a procedure of controlling temperatures of air conditioning devices of an air conditioning system installed in a building.

FIG. 7 is a flowchart illustrating a procedure of controlling temperatures of air conditioning devices installed in a building in an air conditioning system.

Referring to FIG. 7, if an operation starts with an adaptive comfort algorithm, the master controller 510 collects outdoor temperature data of recent days from a database stored in the system or from an external weather server at step 711. Here, the period of collecting temperature data is assumed to be a week but the period may not be limited to a week. Further, the outdoor temperature stored in a database of the system can be obtained from an outdoor temperature detecting unit installed at the outside, and the outdoor temperature detecting unit may be installed in the outdoor device 541-54M or independently from the outdoor device.

After collecting the outdoor temperature data as described above, the master controller 510 calculates a previous exponentially-weighted running mean temperature by using the collected outdoor temperature data as shown by Formula 1. The previous exponentially-weighted running mean temperature can be obtained by multiplying the outdoor temperatures detected for a predetermined period by each predetermined weighted value and calculating an average. Formula 1 calculates the previous exponentially-weighted running mean temperature Trm(n−1) by multiplying outdoor temperatures detected at the same time point from 2 days ago to 8 days ago by each corresponding weighted value and obtaining an average. Subsequently, the master controller 510 obtains a current exponentially-weighted running mean temperature Trm(n) by using the previous exponentially-weighted running mean temperature Trm(n−1) and an outdoor temperature of a base day as shown by Formula 2. Here, the base day may be one day before. In the embodiment of the present invention, the base day is set to yesterday, and the current exponentially-weighted running mean temperature can be obtained by using an outdoor temperature of yesterday and the previous exponentially-weighted running mean temperature. Alternatively, if the base day is set to today, an outdoor temperature of today can be used and the previous exponentially-weighted running mean temperature can be obtained by using an outdoor temperature from 1 day ago to 7 days ago.

Here, more than one exponentially-weighted running mean temperature can be calculated according to the number of detecting units. Namely, if an outdoor temperature detecting unit is installed, the master controller 510 can calculate an exponentially-weighted running mean temperature. However, if more than one outdoor temperature detecting unit is installed and different outdoor temperatures are detected by each outdoor temperature detecting unit, the master controller 510 can calculate more than one exponentially-weighted running mean temperature. In this case, installation locations of the indoor devices 531-53N are identified when setting the comfort temperature, and different comfort temperatures can be set by analyzing the installation locations of the outdoor temperature detecting units and indoor devices.

Subsequently, the master controller 510 sets a cooling or heating mode for the indoor devices 531-53N by analyzing the calculated current exponentially-weighted running mean temperature at step 715. Namely, if the current exponentially-weighted running mean temperature is lower than 10° C., the master controller 510 detects it at step 715 and sets a heating mode for the indoor devices 531-53N at step 719. If the exponentially-weighted running mean temperature is higher than 10° C., the master controller 510 detects it at step 715 and sets a cooling mode for the indoor devices 531-53N at step 717.

Further, the master controller 510 analyzes an installation location of an indoor device at step 724. Namely, the master controller 510 knows the installation locations of each indoor device 531-53N and may set an interior zone at step 723 or an exterior zone at step 727 according to the installation locations of the indoor devices. If the installation locations of the interior zone and the exterior zone are not considered, the master controller 510 sets "all zones" at step 725. Further, the master controller 510 analyzes a consideration of a humidity at step 731. Namely, if a humidity adjustment is set, the master controller 510 sets an adaptive comfort model for a humidity compensation at step 735; otherwise, it sets a temperature-based adaptive comfort model at step 733.

After identifying conditions for setting the comfort temperature as described above (for example, a cooling/heating mode, distance to a window, and humidity adjustment), the master controller 510 calculates a comfort temperature by selecting values A and B for a corresponding condition at step 751. Namely, if the cooling/heating mode is determined according to the exponentially-weighted running mean temperature and if a control zone and a humidity compensation control are identified, the master controller 510 can select values A and B for calculating a comfort temperature from Table 2. When calculating a comfort temperature by using the selected values A and B, the master controller 510 can calculate an indoor comfort temperature Tcomf by multiplying an exponentially-weighted running mean temperature of a corresponding day by a constant A and adding a constant B as shown by Formula 3.

Subsequently, the master controller 510 analyzes a priority mode at step 761 and sets the comfort temperature finally according to the result at steps 763 to 767. Here, the priority mode may include an energy saving mode, normal mode, and comfort priority mode. If the normal mode is selected, the master controller 510 applies the comfort temperature calculated at step 751 as it is at step 765. If the energy saving mode is selected, the cooling mode is set with Tcomf+C and the heating mode is set with Tcomf-C at step 763. If the comfort priority mode is selected, the cooling mode is set with Tcomf-C and the heating mode is set with Tcomf+C at step 767. Namely, the comfort temperature calculated according to the operation mode can be modified finally by a priority mode selected by a supervisor of a building, and the comfort temperature is finally determined according to the energy saving mode, normal mode, or comfort priority mode as shown by Formula 4. For example, a value C may be set to 2, and the energy saving mode and the comfort priority mode may operate by adding 2 to or subtracting 2 from the comfort temperature. However, the value C may not be fixed and may be variable.

After setting the comfort temperature as described above, the master controller 510 transmits the set comfort temperature to the indoor devices 531-53N and controls each indoor device 531-53N with the set comfort temperature. Here, if the conditions of controlling a temperature for the indoor devices 531-53N are different, the master controller 510 can set the comfort temperature by applying values A and B corresponding to each condition. Further, each corresponding comfort temperature can be transmitted to the indoor device 531-53N by analyzing the installation locations and operation conditions of the indoor device 531-53N.

Further, the procedure of setting a comfort temperature shown in FIG. 7 can be repeated at a predetermined time. Namely, the outdoor temperature in a day may differ according to whether it is the night, morning, daytime, and evening. Accordingly, an appropriate comfort temperature can be determined by setting a temperature changing section corresponding to a setting time and repeating the above operations at the setting time.

Further, the constants A and B may use experimentally pre-calculated values (static mode) or be dynamically applied (dynamic mode). Namely, in a general office building, the effort amount of calculation can be reduced by setting the static mode and using the pre-calculated constants A and B; and in a building having a special purpose such as a hospital, factory, and kindergarten, corresponding constants A and B can be calculated and used. A supervisor of a building can apply an algorithm by selecting an operation mode (static or dynamic mode) according to the purpose of use. Here, in case of a dynamic operation mode, additional parameters can be used to obtain the comfort temperature; and a $CO_2$ sensor, occupant detecting sensor, and entrance management database can be used for obtaining the constants A and B in order to reflect the number of occupants and a temperature environment. Here, each parameter can be appropriately combined according to an environment to which they are applied.

The above procedure is repeated periodically at a predetermined time and the air conditioning system operates according to the result of calculating a comfort temperature. In case of a system air conditioner, an indoor temperature can be controlled by controlling a fan revolution of an indoor device, changing an operation period of a compressor, and changing an opening of an electronic expansion valve (EEV).

Recently, more system air conditioners than central air conditioning systems are being installed for an indoor air conditioning purpose in building construction. An air conditioning control system using additional equipment such as a humidity sensor, $CO_2$ sensor, and occupant detecting sensor increases expenses and, in case of an existing building, a new installation work generates a workload in a building management. In an environment of small and medium buildings, a comfort control algorithm can be applied by introducing a simple building control system to a temperature sensor integrated in an indoor device and an outdoor device of the existing system air conditioner without having to install a new sensor.

Accordingly, the air conditioning system according to embodiments of the present invention can secure comfort for occupants and obtain an energy saving effect and can calculate an indoor comfort temperature more precisely by introducing additional parameters such as a cooling/heating mode, interior/exterior zone, priority mode, and humidity compensation control. Further, installation and maintenance costs can be reduced because other sensors other than a temperature sensor are unnecessary in case of operating in a static mode. Generally, the system air conditioner integrates a temperature sensor, and thereby an additional equipment is practically unnecessary. However, in case of dynamic mode, additional input parameters can be introduced to reflect an environment dynamically changing from time to time. Further, the air conditioning system according to the present invention can operate with a comfort control algorithm by selection of an algorithm menu in an icon form as shown in FIG. 6 without complicated functions of a building management system having to be learnt for an energy saving operation. When considering that a building control solution is generally performed by a skilled engineer, providing an easy user operation environment is one of the biggest advantages of the present invention. Further, the present invention can obtain a comfort temperature optimized for various building environments by selecting a method of using pre-calculated values of factors A, B, and C for an adaptive comfort model to reduce the calculation effort or by selecting a method of dynamically calculating the factors according to a building environment.

While the present invention has been shown and described with reference to various embodiments thereof, it will be understood by those skilled in the art that various changes in form and details may be made therein without departing from the spirit and scope of the present invention as defined by the appended claims and their equivalents.

The invention claimed is:

1. A method for controlling an indoor temperature of an air conditioning device, the method comprising:
measuring outdoor temperatures of an outdoor space for a predetermined period;
measuring an indoor humidity of an indoor space;
identifying an operation mode of the air conditioning device;
determining a comfort temperature based on the measured outdoor temperatures and the measured indoor humidity based on identifying that the operation mode of the air conditioning device is a humidity adjustment mode; and
controlling indoor temperature of the indoor space according to the determined comfort temperature,
wherein the operation mode is determined based on a location of the air conditioning device among a plurality of zones predetermined according to a distance from the outdoor space.

2. The method of claim 1, further comprising:
determining a base temperature based on the outdoor temperatures,
wherein the determining the comfort temperature determines based on the base temperature and the indoor humidity.

3. The method of claim 2, further comprising:
determining an outdoor humidity,
wherein the determining the comfort temperature determines based on the base temperature, the outdoor humidity, and the indoor humidity.

4. The method of claim 2,
wherein the determining the comfort temperature determines based on the determined base temperature, the indoor humidity, and an operation condition of the air conditioning device, and
wherein the operation condition is determined based on a location of the air conditioning device among a plurality of zones predetermined according to a distance from the outdoor space.

5. The method of claim 4, wherein the operation condition is further determined based on at least one of:
whether a humidity adjustment operation is required,
whether an energy saving operation is required, or
whether a strict temperature control is required.

6. The method of claim 2, wherein the determining of the comfort temperature comprises:
determining a variable constant and a fixed constant corresponding to an operation condition of the air conditioning device, and
setting a comfort temperature by multiplying the determined base temperature by the variable constant and adding the fixed constant.

7. The method of claim 6, wherein the fixed constant and the variable constant comprise constants obtained through a regression analysis of a distribution relationship between the base temperature and the comfort temperature.

8. The method of claim 6, wherein the fixed constant and the variable constant are determined differently according to a range including the base temperature.

9. The method of claim 6, wherein, in case the operation condition indicates that an energy saving operation is required, the fixed constant is added to or subtracted from the comfort temperature.

10. The method of claim 6, wherein the fixed constant and the variable constant are determined differently according to a range including the indoor humidity measured currently.

11. An air conditioning device comprising:
a temperature detector for measuring outdoor temperatures of an outdoor space for a predetermined period;
a humidity detector for measuring an indoor humidity of an indoor space;
a memory for storing information of:
the outdoor temperatures measured by the temperature detector,
the indoor humidity measured by the humidity detector, and
an operation condition of the air conditioning device; and
a controller configured to:
identify an operation mode of the air conditioning device,
determine a comfort temperature based on measured outdoor temperatures and the measured indoor humidity based on identifying that the operation mode of the air conditioning device is a humidity adjustment mode, and control indoor temperature of the indoor space according to the determined comfort temperature,
wherein the operation mode is determined based on a location of the air conditioning device among a plurality of zones predetermined according to a distance from the outdoor space.

12. The air conditioning device of claim 11, wherein the controller is further configured to:
determine a base temperature based on the measured outdoor temperatures, and
determine the comfort temperature based on the base temperature and the measured indoor humidity.

13. The air conditioning device of claim 12, wherein the controller is further configured to:
determine an outdoor humidity of the outdoor space, and
determine the comfort temperature based on the base temperature, the determined outdoor humidity, and the measured indoor humidity.

14. The air conditioning device of claim 12,
wherein the controller is further configured to determine the comfort temperature based on the determined base temperature, the measured indoor humidity, and an operation condition of the air conditioning device, and
wherein the operation condition is determined based on a location of the air conditioning device among a plurality of zones predetermined according to a distance from the outdoor space.

15. The air conditioning device of claim 14, wherein the controller is further configured to determine the operation condition based on at least one of:
whether a humidity adjustment operation is required,
whether an energy saving operation is required, or
whether a strict temperature control is required.

16. The air conditioning device of claim 12, wherein the controller is further configured to:
determine a variable constant and a fixed constant corresponding to an operation condition of the air conditioning device, and
set a comfort temperature by multiplying the determined base temperature by the variable constant and adding the fixed constant.

17. The air conditioning device of claim 16, wherein the fixed constant and the variable constant are constants obtained through a regression analysis for a distribution relationship between the base temperature and the comfort temperature.

18. The air conditioning device of claim 16, wherein the fixed constant and the variable constant are determined differently according to a range including the base temperature.

19. The air conditioning device of claim 16, wherein, in case the operation condition indicates that an energy saving operation is required, the fixed constant is added to or subtracted from the comfort temperature.

20. The air conditioning device of claim 16, wherein the fixed constant and the variable constant are determined differently according to a range including the indoor humidity measured currently.

* * * * *